No. 736,529. Patented August 18, 1903.

UNITED STATES PATENT OFFICE.

ROBERTO LEPETIT, OF SUSA, ITALY.

FORMALDEHYDE COMPOUND.

SPECIFICATION forming part of Letters Patent No. 736,529, dated August 18, 1903.

Application filed May 23, 1903. Serial No. 158,444. (No specimens.)

*To all whom it may concern:*

Be it known that I, ROBERTO LEPETIT, Ph. D., a subject of the King of Italy, residing at Susa, Italy, have invented certain new and useful Improvements in Therapeutic Compounds, of which the following is a specification.

The combined form of formaldehyde with chemicals of phenolic character gives, as it is known, bodies of valuable properties for therapeutic uses. I have discovered that under suitable conditions a new body resulting from the combination of hematoxylin (the coloring-matter of logwood) with formaldehyde, unknown until to-day, may be prepared.

This new compound has been found very valuable for its peculiar astringent and antiseptical properties. I prepare it as follows: I dissolve ten parts, by weight, of hematoxylin in one hundred parts of water and thirty parts of formaldehyde, (forty per cent.) I heat near to the boil and add twenty-five parts of hydrochloric acid, specific gravity 1.12. As soon as a precipitate is formed I pour the whole into fresh water, where the new body is allowed to settle and then washed and dried.

The new body may also be prepared starting from a decoction of logwood freed from impurities, using one hundred parts of this solution of specific gravity 1.036 to 1.065, heating at about 60° centigrade, and adding ten parts of formaldehyde and, further, still under stirring, eight parts of hydrochloric acid, specific gravity 1.10 to 1.14. The reddish-brown precipitate is allowed to settle during eight to twelve hours, thoroughly washed with cold water until any sour reaction on litmus-paper has disappeared, filtered, and dried at low temperature.

Instead of hydrochloric acid equivalent proportions of other acids may be used. The amount of acid and even of formaldehyde may be smaller; but the preparation requires longer heating and higher temperature.

The new body yields an impalpable tasteless powder of reddish-brown color not soluble in water, soluble in glacial acetic acid, in alcohol, acetic ether, glycerin, or acetone with a bright reddish-brown shade, insoluble in chloroform, very little soluble in ether, soluble in even weak alkaline solutions, with a bright magenta shade turning to blue with more alkali. The alkaline solution is precipitated by addition of acids. The solution in water and alcohol dyes mordanted cotton or wool with shades very similar to those given by logwood.

Heated at 100° centigrade the new compound darkens. At more than 100° centigrade it gives off small quantities of formaldehyde.

According to its chemical behavior the new chemical passes through the stomach unaltered and acts only in the intestines.

Having now given a full and clear description of my invention, I declare that what I claim is—

A new chemical compound of astringent and antiseptical properties being a fine powder of reddish-brown color, insoluble in water, soluble in weak alkaline solutions with a bright magenta color, soluble in alcohol, acetone, or glycerin with a red-brown color, not soluble in chloroform, obtained by reaction of formaldehyde on hematoxylin solutions in presence of acid substantially as described.

In witness whereof I have hereunto signed my name in the presence of two subscribing witnesses.

ROBERTO LEPETIT.

Witnesses:
 MARIO CAPUCCIO,
 MARIO CRIHORNDIME.